Aug. 9, 1955     W. J. FARQUHARSON     2,715,173
PANCAKE GRILL CONTROL HOUSING CONSTRUCTION
Filed June 14, 1951

Inventor
WILLIAM J. FARQUHARSON
by: Fetherstonhaugh & Co.
Att'ys.

United States Patent Office 2,715,173
Patented Aug. 9, 1955

2,715,173

PANCAKE GRILL CONTROL HOUSING CONSTRUCTION

William James Farquharson, Toronto, Ontario, Canada

Application June 14, 1951, Serial No. 231,551

1 Claim. (Cl. 219—19)

This invention relates to a ventilated electric grill construction.

Electric grills employed for restaurant use in frying eggs, cooking pancakes, and other articles of food, are comprised of a grill plate supported in an exposed position above a framework usually having a housing which appears to form the lower structure. In former constructions, therefore, the edge of the grill plate itself projects forwardly of the supporting structure or the supporting structure projects forwardly. In either case, these components reach a temperature which can cause light, and sometimes serious, burns. This hazard has a nuisance value which it is desired to overcome.

Also in prior constructions of grill units, the mounting of controls for the grill on the support therefor has been difficult by reason of the high temperature conditions of the support itself and of the high temperatures attained in the interior of the support housing.

It is a main object of the present invention to provide a support housing for an electric grill or like unit which projects beyond the marginal edges of the grill at least on one edge thereof and which is subjected to the circulation of cool air.

Another object of the invention is to provide a grill support housing structure as before, wherein the heated air is allowed to escape from the interior of the housing in a predetermined way whereby cool air is drawn along with the hot air at the escape opening to cause the housing metal to be cooled.

With these and other objects in view, the invention will be appreciated in more detail in reference to the following specification taken in conjunction with the accompanying drawings.

Figure 1:
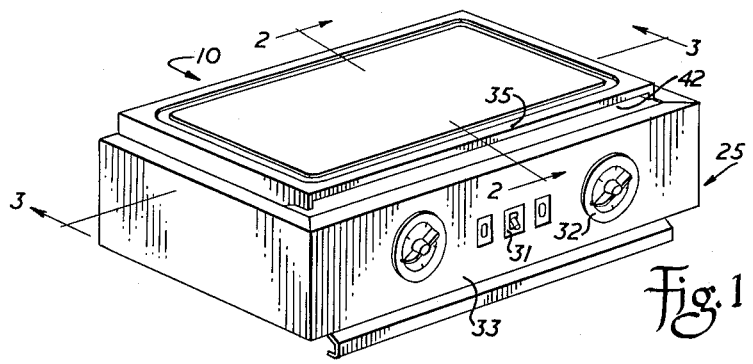
Figure 1 is a perspective view of an electric grill unit according to my invention.

In the drawings, one preferred construction of grill unit is shown which comprises a grill plate 10 formed of a suitable cast material having heating elements 11 of the enclosed type fastened to the under face by suitable means such as the strap 12 fastened to the posts 13 by suitable screws 14. These heating elements may be connected electrically in parallel such as by the wires 15 and other circuits not shown.

Figure 2:
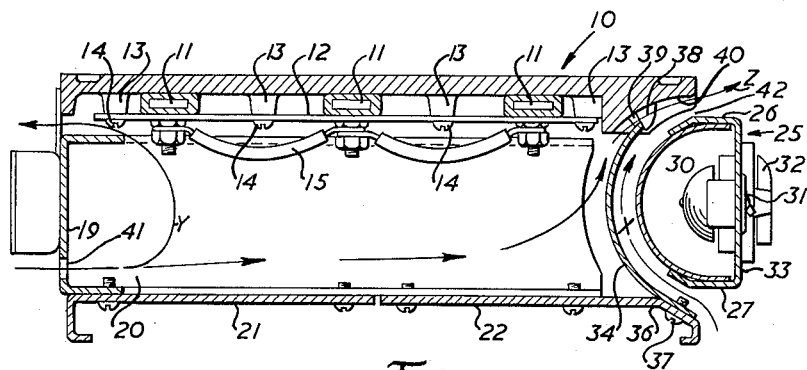
Figure 2 is a sectional view on the line 2—2 of Figure 1.
Figure 3:
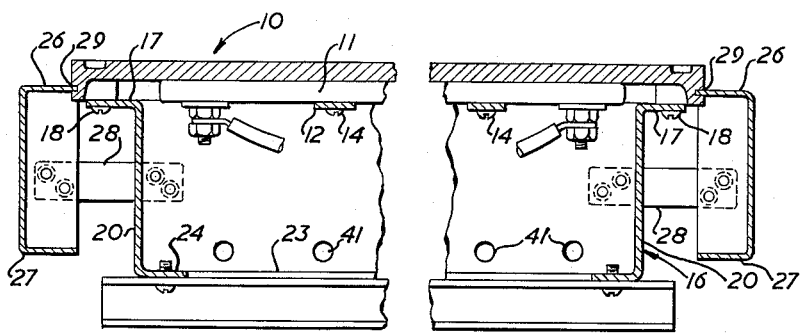
Figure 3 is a sectional view on the line 3—3 of Figure 1.

The grill plate 10 is supported on its side edges by an inner housing 16 having outwardly projecting flanges 17 connecting to the marginal edges of the grill plate by screws 18. The inner housing comprises the back wall 19 and the side walls 20 having no forward wall in the construction shown. Bottom cover plates 21 and 22 are fastened by suitable screws in the manner illustrated to the bottom flanges 23 and 24 of the rear wall 19 and side walls 20. The outer housing 25 preferably extends around the front and sides of the grill unit only and may be of a suitable light metal having inwardly extending top and bottom flanges 26 and 27 as illustrated in Figures 2 and 3. A mounting strap 28 serves to connect the outer housing to the rear wall 19 of the inner housing. The upper flange 26 in the region of the side walls 20 of the inner housing projects inwardly to sit within a groove 29 formed in the grill plate itself. However, the upper flange of the front face of the housing 25, as indicated in Figure 2, does not project to touch the grill plate but is spaced therefrom and in cooperation with the lower flange 27 may serve to support a shield 30 extending substantially the full length of the front face of the housing.

Suitable switches 31 and timers 32 may then be mounted on the front face 33 of the outer housing and be protected by the shield 30.

An inner shield 34 is a particular point of emphasis in the construction of grill units according to the invention. The inner shield extends substantially throughout the full length of the front edge 35 of the grill plate 10 and is mounted on the inner housing such as to the projecting portion 36 of the bottom plate 22 by the screws 37. In particular, the inner shield projects upwardly to engage a downwardly and outwardly extending lug 38 projecting from the grill plate which by the shoulder 39 serves to keep its upper edge in spaced apart relation to the main curved surface 40.

The walls of the inner housing 16 preferably have orifices 41 therein so that cool air will circulate in the direction of the arrows Y in the lower regions of the inner housing and move along with the heated air by path of arrow Z between the inner shield 34 and the curve face 40 of the grill plate 10.

An orifice condition is arrived at along the opening 42 at the front of the grill whereby cool air is drawn by means of the path X up the space between the shield 30 and the inner shield 34 whereby all of the components along the front face of the outer housing are kept cool.

The essentials of the construction disclosed herein comprise an inner shield forming a part of a support housing for a grill which, in association with an edge of the grill, gives rise to an orifice condition wherein hot air escaping from the housing causes cold air to be drawn along the outer face of the shield and wherein an outer housing part is mounted in spaced apart relation to the exterior face whereby it is subjected to the action of the cold air.

Obviously, the construction disclosed herein may be formed to cool one face of a support housing or all faces. It should also be appreciated that the adjacent edge of the grill itself will not become as hot as would ordinarily be the case were there no air circulation conditions attendant of the type described herein. In particular, the positive cooling of a mounting panel such as the front wall 33 of the outer housing allows the mounting of switching and control components not otherwise serviceable in such proximity to a grill plate.

It is intended that the present disclosure should not be construed in any limiting sense other than that indicated by the following claim.

What I claim as my invention is:

A cooking grill construction, comprising in combination: a grill plate having heating means therefor; means for supporting said grill plate; an outer wall having an upper edge outwardly spaced from a marginal edge of the grill plate to define a slot therebetween; an inner shield having an upper edge spaced from the said marginal edge of said grill plate to define an opening therebetween through which heated air from the under surfaces of said grill plate may pass; and means supporting said inner shield in spaced apart relation to said outer wall to define a passageway therebetween through which cool exterior air may be drawn to said opening by the escape of heated air from the latter; said means for supporting the grill plate being in the form of an inner housing and said outer wall forming a part of an outer housing; and orifices in said inner housing permitting air to flow into the interior thereof and when heated, to flow toward the said opening between the grill plate and the inner shield.

References Cited in the file of this patent

UNITED STATES PATENTS

| Number | Name | Date |
|---|---|---|
| 1,504,083 | Shroyer | Aug. 5, 1924 |
| 1,533,175 | Fahrenwald | Apr. 14, 1925 |
| 1,613,777 | Wom | Jan. 11, 1927 |
| 1,711,472 | Lewin | Apr. 30, 1929 |
| 1,717,270 | Shroyer | June 11, 1929 |
| 2,233,463 | Wilson | Mar. 4, 1941 |
| 2,250,029 | Moon et al. | July 22, 1941 |
| 2,304,140 | Bergholm | Dec. 8, 1942 |
| 2,370,863 | Jones | Mar. 6, 1945 |
| 2,525,614 | Nelson et al. | Oct. 10, 1950 |
| 2,526,890 | Mendel | Oct. 24, 1950 |